(12) United States Patent
Bian et al.

(10) Patent No.: US 11,641,226 B2
(45) Date of Patent: May 2, 2023

(54) PRECODING PROCESSING METHOD AND APPARATUS FOR DATA, AND STORAGE MEDIUM

(71) Applicant: ZTE Corporation, Shenzhen (CN)

(72) Inventors: Luanjian Bian, Shenzhen (CN); Bo Dai, Shenzhen (CN); Kun Liu, Shenzhen (CN); Weiwei Yang, Shenzhen (CN); Huiying Fang, Shenzhen (CN); Youjun Hu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/417,842

(22) PCT Filed: Sep. 5, 2019

(86) PCT No.: PCT/CN2019/104528
§ 371 (c)(1),
(2) Date: Jun. 24, 2021

(87) PCT Pub. No.: WO2020/134176
PCT Pub. Date: Jul. 2, 2020

(65) Prior Publication Data
US 2022/0069870 A1     Mar. 3, 2022

(30) Foreign Application Priority Data

Dec. 25, 2018    (CN) .......................... 201811594033.8

(51) Int. Cl.
*H04J 11/00*      (2006.01)
*H04B 7/0456*    (2017.01)
(Continued)

(52) U.S. Cl.
CPC ......... *H04B 7/0478* (2013.01); *H04B 7/0639* (2013.01); *H04L 5/0053* (2013.01);
(Continued)

(58) Field of Classification Search
CPC .... H04B 7/0695; H04B 7/088; H04B 7/0456; H04B 7/0617; H04B 7/0413;
(Continued)

(56) References Cited

U.S. PATENT DOCUMENTS 8,000,258 B2 * 8/2011 Ko ........................ H04L 5/0053
370/278
10,986,622 B2 * 4/2021 Zhang .................... H04B 7/088
(Continued)

FOREIGN PATENT DOCUMENTS

CN     101938336 A    1/2011
CN     104838713 A    8/2015
(Continued)

OTHER PUBLICATIONS

International Search Report for corresponding application PCT/CN2019/104528 filed Jul. 2, 2020; dated Nov. 27, 2019.
(Continued)

*Primary Examiner* — Eva Y Puente
(74) *Attorney, Agent, or Firm* — Cantor Colburn LLP

(57) ABSTRACT

The present disclosure provides a precoding processing method and apparatus for data, and a storage medium. The method includes: determining a precoding mode according to a type of a control channel, wherein the precoding mode at least includes one of: a predefined precoding mode or a
(Continued)

A sending end determines a precoding mode according to a type of a control channel, wherein the precoding mode at least includes one of: a predefined precoding mode or a feedback precoding mode    ⟋ S102

The sending end performs precoding processing on data of the control channel according to the precoding mode    ⟋ S104 feedback precoding mode; and performing precoding processing on data of the control channel according to the precoding mode.

19 Claims, 3 Drawing Sheets

(51) Int. Cl.
*H04B 7/06* (2006.01)
*H04L 5/00* (2006.01)
*H04W 4/70* (2018.01)

(52) U.S. Cl.
CPC ......... *H04J 11/0056* (2013.01); *H04L 5/0023* (2013.01); *H04L 5/0051* (2013.01); *H04W 4/70* (2018.02)

(58) Field of Classification Search
CPC .. H04B 7/0639; H04B 17/327; H04B 7/0691; H04W 72/042; H04W 76/27; H04W 74/0833; H04W 72/0453; H04W 72/0446; H04W 72/14; H04W 72/046; H04L 5/0053; H04L 5/001; H04L 5/0048; H04L 5/0094; H04L 5/0055; H04L 5/0007; H04L 5/0051; H04L 5/0023
USPC .......................................................... 375/267
See application file for complete search history.

(56) References Cited

U.S. PATENT DOCUMENTS

| | | | |
|---|---|---|---|
| 2008/0233902 A1* | 9/2008 | Pan | ...................... H04B 7/0654 375/296 |
| 2016/0127097 A1 | 5/2016 | Chen | |
| 2018/0167115 A1* | 6/2018 | Zhu | ...................... H04B 7/0695 |
| 2018/0242327 A1* | 8/2018 | Frenne | ................ H04L 25/0204 |
| 2018/0279101 A1 | 9/2018 | Rico Alvarino | |
| 2019/0028305 A1* | 1/2019 | Zhang | ..................... H04L 5/005 |

FOREIGN PATENT DOCUMENTS

| | | |
|---|---|---|
| CN | 107547185 A | 1/2018 |
| EP | 2738950 A2 | 6/2014 |
| EP | 3836466 A1 | 6/2021 |
| WO | WO-2013153276 A1 * | 10/2013 ........... H04B 7/0456 |
| WO | 2020204775 A1 | 10/2020 |

OTHER PUBLICATIONS

European Search Report for corresponding application EP 19906130; Report dated Jan. 20, 2022.

Indian Office Action for corresponding application 202117029118; Report dated Jun. 3, 2022.

* cited by examiner

Indication of precoding information of a control channel

PRECODING PROCESSING METHOD AND APPARATUS FOR DATA, AND STORAGE MEDIUM

TECHNICAL FIELD

The present disclosure relates to the field of communications, and in particular, to a precoding processing method and apparatus for data, and a storage medium.

BACKGROUND

In Machine Type Communication (MTC), an MTC-Physical Downlink Control Channel (MPDCCH) sends data in a precoding manner. In an MPDCCH of Release-15 version, a receiver uses Demodulation Reference Signal (DMRS)-based channel estimation; and in Release-16 version, in order to enhance the performance of the MPDCCH, the receiver may use a Cell-specific Reference Signal (CRS) and a DMRS to perform joint channel estimation. However, joint channel estimation by using CRS and DMRS requires the receiver to learn precoding matrix information used by a sender. Therefore, how a sender precodes data of a control channel to make a terminal learn precoding information used for sending data is a problem to be solved.

Regarding the problem in the related art concerning which encoding mode a sender uses to precode data of a control channel, no effective technical solution has been proposed.

SUMMARY

The embodiments of the present disclosure provide a precoding processing method and apparatus for data, and a storage medium, which may at least solve the problem in the related art concerning which encoding mode a sender uses to precode data of a control channel.

According to some embodiments of the present disclosure, a precoding processing method for data is provided. The method includes the following operations: a precoding mode is determined according to a type of a control channel, wherein the precoding mode at least includes one of: a predefined precoding mode or a feedback precoding mode: and precoding processing is performed on data of the control channel according to the precoding mode.

According to some other embodiments of the present disclosure, a precoding processing apparatus for data is also provided. The apparatus includes: a determination module, configured to determine a precoding mode according to a type of a control channel, wherein the precoding mode at least includes one of: a predefined precoding mode or a feedback precoding mode; and a processing module, configured to perform precoding processing on data of the control channel according to the precoding mode.

According to some other embodiments of the present disclosure, a storage medium is also provided. The storage medium has computer programs stored therein, wherein the computer programs are configured to execute, when running, the precoding processing method for data according to any one above.

By means of the embodiments of the present disclosure, a precoding mode can be determined according to a type of a control channel, and then precoding processing is performed on data of the control channel according to the precoding mode. The described technical solution can be used to solve the problem in the related art concerning which encoding mode a sender uses to precode data of a control channel, and can perform precoding processing on data of the control channel in a precoding mode determined according to the type of the control channel.

BRIEF DESCRIPTION OF THE DRAWINGS

The accompanying drawings described herein are used to provide a deeper understanding of the present disclosure, and constitute a part of the present application. The exemplary embodiments of the present disclosure and the description thereof are used to explain the present disclosure. The drawings and the exemplary embodiment do not constitute limitations to the present disclosure. In the drawings.

DETAILED DESCRIPTION

The present disclosure is described below in detail with reference to the drawings and in conjunction with the embodiments. It is to be noted that embodiments in the present application and characteristics in the embodiments may be combined to derive other embodiments not explicitly described.

It is to be noted that the terms "first", "second" and the like in the specification, the claims and the drawings of the present disclosure are used to distinguish similar objects, and are not used to describe a specific sequence or a precedence order.

The technical solutions of some embodiments of the present disclosure are applied between a sender and a receiver (e.g., a terminal). After determining a precoding mode according to a type of a control channel, the sender performs precoding processing on data of the control channel according to the determined precoding mode. After the receiver receives the processed data, as the receiver has known the type of the control channel, the terminal can know the precoding mode used by the sender.

Figure 1:
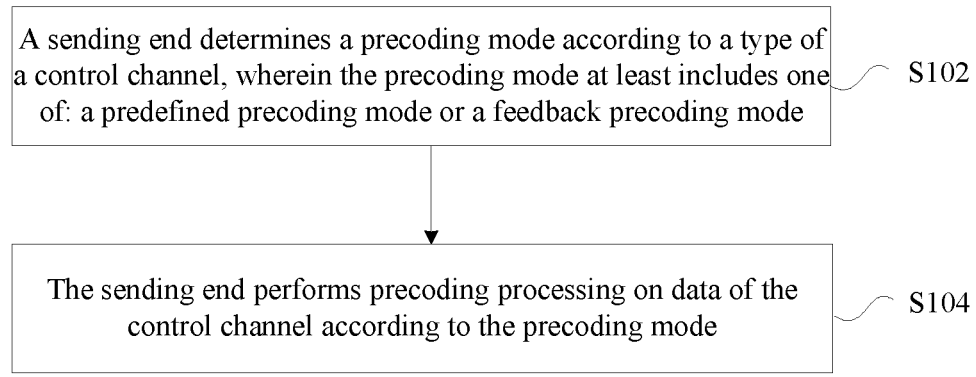
FIG. 1 is a flowchart of a precoding processing method for data according to some embodiments of the present disclosure.

Some embodiments provide a precoding processing method for data, which can also be understood as a precoding processing method for a control channel. FIG. 1 is a flowchart of a precoding processing method for data according to some embodiments of the present disclosure. As shown in FIG. 1, the flow includes operations S102 to S104.

In operation S102, a sender determines a precoding mode according to a type of a control channel, wherein the precoding mode at least includes one of: a predefined precoding mode or a feedback precoding mode.

In operation S104, the sender performs precoding processing on data of the control channel according to the precoding mode.

By means of the described operations, a precoding mode can be determined according to the type of the control channel, and then precoding processing is performed on data of the control channel according to the precoding mode. The described technical solution can be used to solve the problem in the related art concerning which encoding mode a sender uses to precode data of a control channel, and can perform precoding processing on data of the control channel in a precoding mode determined according to the type of the control channel.

In some embodiments of the present disclosure, the operation that the precoding mode is determined according to the type of the control channel includes: the precoding mode is determined at least according to a type of a search space of the control channel.

In some embodiments of the present disclosure, the type of the search space at least includes one of: type-1 common search space, type-2 common search space or UE-specific search space. The precoding mode at least includes one of: a first predefined precoding mode, a second predefined precoding mode or the feedback precoding mode. The control channel of the type-1 common search space uses the first predefined precoding mode. The control channel of the type-2 common search space uses the first predefined precoding mode. The control channel of the UE-specific search space uses at least one of: the first predefined precoding mode, the second predefined precoding mode and the feedback precoding mode.

In some embodiments of the present disclosure, the type of the search space may further include: a type-3 common search space. The control channel of the type-3 common search space uses at least one of: the first predefined precoding mode, the second predefined precoding mode and the feedback precoding mode.

In some embodiments of the present disclosure, the predefined precoding mode includes the following operations: a precoding codebook set is determined: and precoding codebooks in the precoding codebook set are sequentially used, based on the precoding codebook set, for the control channel in a circular manner.

In some embodiments of the present disclosure, the operation that precoding codebooks in the precoding codebook set are sequentially used, based on the precoding codebook set, for the control channel in the circular manner may be implemented in the following manner. Within one subframe, one or more precoding codebooks are updated every X physical resource blocks. Between different subframes, one or more precoding codebooks are updated every Y continuous subframes, and one precoding codebook used for a minimum physical resource block on a subframe m+Y is in a successive relationship with one precoding codebook used for a maximum physical resource block on a subframe m. Herein, m is greater than or equal to 0, and X and Y are positive integers.

In some embodiments of the present disclosure, the first predefined precoding mode includes: two precoding codebooks are used for one physical resource block, wherein in a case where precoding codebooks in a precoding codebook set are sequentially numbered from 0 to N−1, codebook numbers of the two precoding codebooks used for one physical resource block k on a subframe j are respectively $$\left(2\cdot\left\lceil\frac{P}{X}\right\rceil\cdot\left\lfloor\frac{j}{Y}\right\rfloor+2\cdot\left\lfloor\frac{k}{X}\right\rfloor\right)\bmod N$$

and $$\left(2\cdot\left\lceil\frac{P}{X}\right\rceil\cdot\left\lfloor\frac{j}{Y}\right\rfloor+2\cdot\left\lfloor\frac{k}{X}\right\rfloor+1\right)\bmod N,$$

where j and k are greater than or equal to 0, and P is the number of physical resource blocks occupied by data transmission of the control channel or the number of physical resource blocks included in one or more physical resource block sets of a Machine Type Communication-Physical Downlink Control Channel (MPDCCH).

In some embodiments of the present disclosure, the second predefined precoding mode includes: one precoding codebook is used for one physical resource block, wherein in a case where precoding codebooks in a precoding codebook set are sequentially numbered from 0 to N−1, a codebook number of the one precoding codebook used for the physical resource block k on a subframe j is $$\left(\left\lceil\frac{P}{X}\right\rceil\cdot\left\lfloor\frac{j}{Y}\right\rfloor+kX\right)\bmod N,$$

where j and k are greater than or equal to 0, and P is the number of physical resource blocks occupied by data transmission of the control channel or the number of physical resource blocks included in one or more physical resource block sets of a Machine Type Communication-Physical Downlink Control Channel (MPDCCH).

In some embodiments of the present disclosure, the operation that precoding codebooks in the precoding codebook set are sequentially used, based on the precoding codebook set, for the control channel in the circular manner may be implemented in the following manner. Within one subframe, one or more precoding codebooks are updated every X physical resource blocks. Between different subframes, one or more precoding codebooks are updated every Y continuous subframes, and one precoding codebook used for a minimum PRB on a subframe m+Y is the same as one precoding codebook used for a maximum PRB on a subframe m. Herein, m is greater than or equal to 0, and X and Y are positive integers.

In some embodiments of the present disclosure, the first predefined precoding mode includes: two precoding codebooks are used for one physical resource block, wherein in a case where precoding codebooks in a precoding codebook set are sequentially numbered from 0 to N−1, codebook numbers of the two precoding codebooks used for one physical resource block k on a subframe j are respectively $$\left(\left(2\cdot\left\lceil\frac{P}{X}\right\rceil-1\right)\cdot\left\lfloor\frac{j}{Y}\right\rfloor+2\cdot\left\lfloor\frac{k}{X}\right\rfloor\right)\bmod N$$

and $$\left(\left(2\cdot\left\lceil\frac{P}{X}\right\rceil-1\right)\cdot\left\lfloor\frac{j}{Y}\right\rfloor+2\cdot\left\lfloor\frac{k}{X}\right\rfloor+1\right)\bmod N,$$

where j and k are greater than or equal to 0, and P is the number of physical resource blocks occupied by data transmission of the control channel or the number of physical resource blocks included in one or more physical resource block sets of a Machine Type Communication-Physical Downlink Control Channel (MPDCCH).

In some embodiments of the present disclosure, the second predefined precoding mode includes: one precoding codebook is used for one physical resource block, wherein in a case where precoding codebooks in a precoding codebook set are sequentially numbered from 0 to N−1, a codebook number of the one precoding codebook used for the physical resource block k on a subframe j is $$\left(\left(\left\lceil\frac{P}{X}\right\rceil-1\right)\cdot jY+kX\mathrm{mod}N,\right.$$

wherein j and k are greater than or equal to 0, and P is the number of physical resource blocks occupied by data transmission of the control channel or the number of physical resource blocks included in one or more physical resource block sets of a Machine Type Communication-Physical Downlink Control Channel (MPDCCH).

In some embodiments of the present disclosure, the precoding codebook set includes: repeated precoding codebooks.

In some embodiments of the present disclosure, the precoding codebook set includes: odd number of precoding codebooks.

In some embodiments of the present disclosure, the second predefined precoding mode includes: within one subframe, for demodulation reference signal, a precoding codebook is updated every X physical resource blocks; and for data, a precoding codebook is updated every L resource elements, wherein X and L are both positive integers.

In some embodiments of the present disclosure, the operation that the precoding codebook is updated every L resource elements includes: the precoding codebook is updated for each resource element, or the precoding codebook is updated for each resource element group, or the precoding codebook is updated for each control channel element.

In some embodiments of the present disclosure, the second predefined precoding mode includes: for demodulation reference signal, the precoding codebook is updated according to a physical resource block index and a subframe index; and for data, the precoding codebook is updated according to a resource element index or a resource element group index or a control channel element index.

In some embodiments of the present disclosure, in a case where X is equal to the number of physical resource blocks included in one or more physical resource block sets of the control channel, one or more fixed precoding codebooks are used for demodulation reference signal of the control channel in frequency domain.

In some embodiments of the present disclosure, the feedback precoding mode includes: control signalling is sent via a control channel. The control signalling is used for indicating that precoding codebooks used for a next control channel at least includes one of: a precoding codebook corresponding to the latest precoding matrix indicator (PMI) reported by a receiver, or precoding codebooks corresponding to the second predefined precoding mode. In the embodiments, the latest PMI reported by the receiver is the latest PMI which is reported by the receiver and available to a sender.

In some embodiments of the present disclosure, in a case where the control channel is used for scheduling a physical shared channel of a transmission mode 4 or a transmission mode 6, a signalling of precoding matrix indicator confirmation is used for indicating that the precoding codebooks used for the next control channel at least include one of: the precoding codebook corresponding to the latest precoding matrix indicator reported by the receiver, or the precoding codebooks corresponding to the second predefined precoding mode.

In some embodiments of the present disclosure, in a case where the control channel is used for scheduling a physical shared channel of a transmission mode 9, a signalling of antenna port and scrambling identity is used for indicating that the precoding codebooks used for the next control channel at least include one of: the precoding codebook corresponding to the latest precoding matrix indicator reported by the receiver, or the precoding codebooks corresponding to the second predefined precoding mode.

Hereinafter, the described precoding processing will be described with reference to an example, but the example is not intended to limit the technical solutions of the embodiments of the present disclosure.

A precoding method (equivalent to the precoding mode mentioned in the described embodiments) is determined according to a type of a control channel, wherein the precoding method includes a predefined precoding mode or a feedback precoding mode. Control channels of a type-1 common search space and a type-2 common search space use the first predefined precoding mode. Control channels of a UE-specific search space use the second predefined precoding mode and/or the feedback precoding mode. Control channels of a type-3 common search space use the second predefined precoding mode and/or the feedback precoding mode.

The described three precoding modes include: a first predefined precoding mode, a second predefined precoding mode and a feedback precoding mode.

The predefined precoding mode includes: a precoding codebook set is determined; and precoding codebooks in the precoding codebook set are sequentially used, based on the precoding codebook set, for the control channel in a circular manner.

Further, the operation that precoding codebooks in the precoding codebook set are sequentially used, based on the precoding codebook set, for the control channel in the circular manner includes the following two alternative solutions (solution I and solution II).

Solution I: within one subframe, one or more precoding codebooks are updated every X physical resource blocks; and between different subframes, one or more precoding codebooks are updated every Y continuous subframes, and one precoding codebook used for a minimum PRB on a subframe m+Y is in a successive relationship with one precoding codebook used for a maximum PRB on a subframe m.

For the first predefined precoding mode, two precoding codebooks are used for one PRB. In solution I, in a case where precoding codebooks in a precoding codebook set are sequentially numbered from 0 to N−1, the indexes of two precoding matrices used for the kth physical resource block on the jth subframe are respectively $$\left(2\cdot\left\lceil\frac{P}{X}\right\rceil\cdot\left\lfloor\frac{j}{Y}\right\rfloor+2\cdot kX\ \mathrm{mode}\ N\right.$$

and 2·PX·jY+2·kX+1 mod N.

For the second predefined precoding mode, one precoding codebook is used for one PRB. In solution in a case where precoding codebooks in a precoding codebook set are sequentially numbered from 0 to N−1, a codebook number of the one precoding codebook used for the physical resource block k on a subframe j is $$\left(\left\lceil \frac{P}{X} \right\rceil \cdot \left\lfloor \frac{j}{Y} \right\rfloor + \left\lfloor \frac{k}{X} \right\rfloor\right) \bmod N,$$

where j and k are greater than or equal to 0, and P is the number of PRBs occupied by data transmission of the control channel or the number of PRBs included in one or more physical resource block sets of an MPDCCH.

Solution II: within one subframe, one or more precoding codebooks are updated every X physical resource blocks; and between different subframes, one or more precoding codebooks are updated every Y continuous subframes, and one precoding codebook used for a minimum PRB on a subframe m+Y is the same as one precoding codebook used for a maximum PRB on a subframe m, wherein m is greater than or equal to 0, and X and Y are greater than or equal to 1.

For the first predefined precoding mode, two precoding codebooks are used for one PRB. In solution II, in a case where precoding codebooks in a precoding codebook set are sequentially numbered from 0 to N−1, codebook numbers of the two precoding codebooks used for one physical resource block k on a subframe j are respectively $$\left(\left(2 \cdot \left\lceil \frac{P}{X} \right\rceil - 1\right) \cdot \left\lfloor \frac{j}{Y} \right\rfloor + 2 \cdot kX \right) \bmod N$$

and 2·PX−1·jY+2·kX+1 mod N, where j and k are greater than or equal to 0, and P is the number of PRBs occupied by data transmission of the control channel or the number of PRBs included in one or more physical resource block sets of an MPDCCH.

For the first predefined precoding mode, one precoding codebook is used for one physical resource block. In solution II, in a case where precoding codebooks in a precoding codebook set are sequentially numbered from 0 to N−1, a codebook number of the one precoding codebook used for the physical resource block k on a subframe j is $$\left(\left(\left\lceil \frac{P}{X} \right\rceil - 1\right) \cdot \left\lfloor \frac{j}{Y} \right\rfloor + \left\lfloor \frac{k}{X} \right\rfloor\right) \bmod N,$$

where j and k are greater than or equal to 0, and P is the number of PRBs occupied by data transmission of the control channel or the number of PRBs included in one or more physical resource block sets of an MPDCCH.

The second predefined precoding mode may further include the following solutions: within one subframe, for demodulation reference signal, precoding codebooks are updated by taking X physical resource blocks as update granularity; and for data, precoding codebooks are updated by taking resource elements or resource element groups or control channel elements as update granularity.

For demodulation reference signal, precoding codebooks are updated according to a physical resource block index and a subframe index; and for data, precoding codebooks are updated according to a resource element index or a resource element group index or a control channel element index.

The feedback precoding solution is as follows: control signalling is sent via a control channel, wherein the control signalling is used for indicating precoding codebooks of a next control channel. In some embodiments of the present disclosure, the precoding codebooks of the control channel at least include one of: a precoding codebook corresponding to the latest precoding matrix indicator reported by a receiver, or precoding codebooks corresponding to the second predefined precoding mode.

In a case where the control channel is used for scheduling a physical shared channel of a transmission mode 4 or a transmission mode 6, the control signalling indicates both precoding codebooks of the physical shared channel, and precoding codebooks of the control channel.

In a case where the control channel is used for scheduling a physical shared channel of a transmission mode 9, the control signalling indicates both antenna port and scrambling identity of the physical shared channel, and precoding codebooks of the control channel.

Through the description of the above implementations, those having ordinary skill in the art can understand that the method according to the above embodiment may be implemented by means of software plus a necessary general hardware platform, and of course, may also be implemented through hardware, but in many cases, the former is a better implementation. Based on such understanding, the essence of technical solution of the embodiments of the present disclosure, or in other words, the part of the technical solutions making contributions to the conventional art, may be embodied in the form of a software product stored in a storage medium (such as a Read-Only Memory (ROM)/Random Access Memory (RAM), a magnetic disk and an optical disc), including a number of instructions for enabling a terminal device (which may be a mobile phone, a computer, a server, or a network device, etc.) to perform the methods described in various embodiments of the present disclosure.

The present embodiment provides a precoding processing apparatus for data. The apparatus is used to implement the above embodiments and exemplary implementations, and the details having been described will not be repeated. As used below, the term "module" may implement a combination of software and/or hardware of a predetermined function. Although the apparatus described in the following embodiments is preferably implemented in software, the implementation in hardware or a combination of software and hardware is also possible and contemplated.

Figure 2:
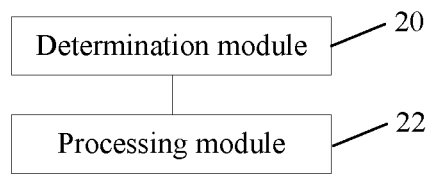
FIG. 2 is a structural block diagram of a precoding processing apparatus for data according to some embodiments of the present disclosure.

FIG. 2 is a structural block diagram of a precoding processing apparatus for data according to some embodiments of the present disclosure. As shown in FIG. 2, the apparatus includes:

a determination module 20, configured to determine a precoding mode according to a type of a control channel, wherein the precoding mode at least includes one of: a predefined precoding mode or a feedback precoding mode; and a processing module 22, configured to perform precoding processing on data of the control channel according to the precoding mode.

By means of the embodiments of the present disclosure, a precoding mode can be determined according to the type of the control channel, and then precoding processing is performed on data of the control channel according to the precoding mode. The described technical solution can be used to solve the problem in the related art concerning which encoding mode a sender uses to precode data of a control channel, and can perform precoding processing on data of the control channel in a precoding mode determined according to the type of the control channel.

In some embodiments of the present disclosure, the determination module 20 is configured to determine the precoding mode at least according to a type of a search space of the control channel.

In some embodiments of the present disclosure, the type of the search space at least includes one of: type-1 common search space, type-2 common search space or UE-specific search space. The precoding mode at least includes one of: a first predefined precoding mode, a second predefined precoding mode or the feedback precoding mode. The control channel of the type-1 common search space uses the first predefined precoding mode. The control channel of the type-2 common search space uses the first predefined precoding mode. The control channel of the UE-specific search space uses at least one of: a first predefined precoding mode, a second predefined precoding mode or the feedback precoding mode.

In some embodiments of the present disclosure, the type of the search space may further include a type-3 common search space. The control channel of the type-3 common search space uses at least one of: the first predefined precoding mode, the second predefined precoding mode and the feedback precoding mode.

In some embodiments of the present disclosure, the predefined precoding mode includes: a precoding codebook set is determined; and precoding codebooks in the precoding codebook set are sequentially used, based on the precoding codebook set, for the control channel in a circular manner.

In some embodiments of the present disclosure, the operation that precoding codebooks in the precoding codebook set are sequentially used, based on the precoding codebook set, for the control channel in the circular manner may be implemented in the following manner. Within one subframe, one or more precoding codebooks are updated every X physical resource blocks. Between different subframes, one or more precoding codebooks are updated every Y continuous subframes, one precoding codebook used for a minimum physical resource block on a subframe m+Y is in a successive relationship with one precoding codebook used for a maximum physical resource block on a subframe m, wherein m is greater than or equal to 0, and X and Y are positive integers.

In some embodiments of the present disclosure, the first predefined precoding mode includes: two precoding codebooks are used for one physical resource block, wherein in a case where precoding codebooks in a precoding codebook set are sequentially numbered from 0 to N−1, codebook numbers of the two precoding codebooks used for one physical resource block k on a subframe j are respectively $$\left(2\cdot\left\lceil\frac{P}{X}\right\rceil\cdot\left\lfloor\frac{j}{Y}\right\rfloor+2\cdot\left\lfloor\frac{k}{X}\right\rfloor\right)\bmod N$$

and $$\left(2\cdot\left\lceil\frac{P}{X}\right\rceil\cdot\left\lfloor\frac{j}{Y}\right\rfloor+2\cdot\left\lfloor\frac{k}{X}\right\rfloor+1\right)\bmod N,$$

where j and k are greater than or equal to 0, and P is the number of physical resource blocks occupied by data transmission of the control channel or the number of physical resource blocks included in one or more physical resource block sets of a Machine Type Communication-Physical Downlink Control Channel (MPDCCH).

In some embodiments of the present disclosure, the second predefined precoding mode includes: one precoding codebook is used for one physical resource block, wherein in a case where precoding codebooks in a precoding codebook set are sequentially numbered from 0 to N−1, a codebook number of the one precoding codebook used for the physical resource block k on a subframe j is $$\left(\left\lceil\frac{P}{X}\right\rceil\cdot\left\lfloor\frac{j}{Y}\right\rfloor+kX\right)\bmod N,$$

wherein j and k are greater than or equal to 0, and P is the number of physical resource blocks occupied by data transmission of the control channel or the number of physical resource blocks included in one or more physical resource block sets of a Machine Type Communication-Physical Downlink Control Channel (MPDCCH).

In some embodiments of the present disclosure, the operation that precoding codebooks in the precoding codebook set are sequentially used, based on the precoding codebook set, for the control channel in the circular manner may be implemented in the following manner. Within one subframe, one or more precoding codebooks are updated every X physical resource blocks. Between different subframes, one or more precoding codebooks are updated every Y continuous subframes, and one precoding codebook used for a minimum PRB on a subframe m+Y is the same as one precoding codebook used for a maximum PRB on a subframe m, wherein m is greater than or equal to 0, and X and Y are positive integers.

In some embodiments of the present disclosure, the first predefined precoding mode includes: two precoding codebooks are used for one physical resource block, wherein in a case where precoding codebooks in a precoding codebook set are sequentially numbered from 0 to N−1, codebook numbers of the two precoding codebooks used for one physical resource block k on a subframe j are respectively $$\left(\left(2\cdot\left\lceil\frac{P}{X}\right\rceil-1\right)\cdot\left\lfloor\frac{j}{Y}\right\rfloor+2\cdot\left\lfloor\frac{k}{X}\right\rfloor\right)\bmod N$$

and $$\left(\left(2\cdot\left\lceil\frac{P}{X}\right\rceil-1\right)\cdot\left\lfloor\frac{j}{Y}\right\rfloor+2\cdot\left\lfloor\frac{k}{X}\right\rfloor+1\right)\bmod N,$$

where j and k are greater than or equal to 0, and P is the number of physical resource blocks occupied by data transmission of the control channel or the number of physical resource blocks included in one or more physical resource block sets of a Machine Type Communication-Physical Downlink Control Channel (MPDCCH).

In some embodiments of the present disclosure, the second predefined precoding mode includes: one precoding codebook is used for one physical resource block, wherein in a case where precoding codebooks in a precoding codebook set are sequentially numbered from 0 to N−1, a codebook number of the one precoding codebook used for the physical resource block k on a subframe j is $$\left(\left(\left\lceil\frac{P}{X}\right\rceil-1\right)\cdot\left\lfloor\frac{j}{Y}\right\rfloor+\left\lfloor\frac{k}{X}\right\rfloor\right)\bmod N,$$

where j and k are greater than or equal to 0, and P is the number of physical resource blocks occupied by data transmission of the control channel or the number of physical resource blocks included in one or more physical resource block sets of a Machine Type Communication-Physical Downlink Control Channel (MPDCCH).

In some embodiments of the present disclosure, the precoding codebook set includes: repeated precoding codebooks.

In some embodiments of the present disclosure, the precoding codebook set includes: odd number of precoding codebooks.

In some embodiments of the present disclosure, the second predefined precoding mode includes: within one subframe, for demodulation reference signal of the control channel, a precoding codebook is updated every X physical resource blocks; and for data of the control channel, a precoding codebook is updated every L resource elements, wherein X and L are both positive integers.

In some embodiments of the present disclosure, the operation that the precoding codebook is updated every L resource elements includes: for data of a control channel, the precoding codebook is updated for each resource element, or the precoding codebook is updated for each resource element group, or the precoding codebook is updated for each control channel element.

In some embodiments of the present disclosure, the second predefined precoding mode includes: for demodulation reference signal of the control channel, the precoding codebook is updated according to a physical resource block index and a subframe index; and for data of the control channel, the precoding codebook is updated according to a resource element index or a resource element group index or a control channel element index.

In some embodiments of the present disclosure, in a case where X is equal to the number of physical resource blocks included in one or more physical resource block sets of the control channel, one or more fixed precoding codebooks are used for demodulation reference signal of the control channel in frequency domain.

In some embodiments of the present disclosure, the feedback precoding mode includes: control signalling is sent via a control channel, wherein the control signalling is used for indicating that precoding codebooks used for a next control channel at least includes one of: the precoding codebook corresponding to the latest precoding matrix indicator reported by the receiver, or precoding codebooks corresponding to the second predefined precoding mode.

In some embodiments of the present disclosure, in a case where the control channel is used for scheduling a physical shared channel of a transmission mode 4 or a transmission mode 6, a signalling of precoding matrix indicator confirmation is used for indicating that the precoding codebooks used for the next control channel at least include one of: the precoding codebook corresponding to the latest precoding matrix indicator reported by the receiver, or the precoding codebooks corresponding to the second predefined precoding mode.

In some embodiments of the present disclosure, in a case where the control channel is used for scheduling a physical shared channel of a transmission mode 9, a signalling of antenna port and scrambling identity is used for indicating that the precoding codebooks used for the next control channel at least include one of: the precoding codebook corresponding to the latest is precoding matrix indicator reported by the receiver, or the precoding codebooks corresponding to the second predefined precoding mode.

It should be noted that the technical solutions in the described embodiment 1 and embodiment 2 may be used in combination, or may be used alone, and the embodiments of the present disclosure are not limited thereto.

The described technical solutions will be described below in combination with exemplary embodiments, but are not intended to limit the technical solutions of the embodiments of the present disclosure.

Exemplary Embodiment 1

Exemplary embodiment 1 of the present disclosure provides a method for precoding of a control channel. The method includes the following operations.

A precoding method is determined according to a type of the control channel, wherein the precoding method includes a predefined precoding mode or a feedback precoding mode. Precoding processing is performed on data of the control channel according to the precoding method.

In exemplary embodiment 1 of the present disclosure, the precoding method is determined at least according to a type of a search space of the control channel. Control channels of a type-1 common search space (CSS for short) and a type-2 common search space use the first predefined precoding mode. Control channels of a UE-specific Search Space (USS for short) use the second predefined precoding mode and/or the feedback precoding mode. The type-1 common search space represents type-1 common search space (type-1 CSS) of an MPDCCH, and the type-2 common search space represents type-2 common search space (type-2 CSS) of an MPDCCH.

In exemplary embodiment 1 of the present disclosure, control channels of a type-3 common search space use the second predefined precoding mode and/or the feedback precoding mode, wherein the type-3 common search space represents type-0 common search space (type-0 CSS) of an MPDCCH.

In the exemplary embodiment 1 of the present disclosure, the predefined precoding mode includes: a precoding codebook set is determined; and precoding codebooks in the precoding codebook set are sequentially used, based on the precoding codebook set, for the control channel in a circular manner. If learning a codebook update rule of the predefined precoding mode, a receiver can determine precoding codebooks used for a control channel. One precoding codebook is one precoding matrix.

In one or more exemplary implementations, the predefined precoding mode includes: based on the precoding codebook set, in frequency domain, one or more precoding codebooks are updated every X physical resource blocks, and the precoding matrices used within the X continuous PRBs do not change; and on a time domain, one or more precoding codebooks are updated every Y continuous subframes, with regard to any one PRB, precoding matrices used for the PRB within the Y continuous subframes do not change, and one precoding codebook used for the minimum PRB of a subframe m+Y is in a successive relationship with one precoding codebook used for the maximum PRB of a subframe m. The minimum PRB refers to a PRB with the minimum index or a PRB with the lowest frequency, and the maximum PRB refers to a PRB with the maximum index or a PRB with the highest frequency, wherein m is greater than or equal to 0, and X and Y are greater than or equal to 1.

In one or more exemplary implementations of the present embodiment, assuming that precoding codebooks in a precoding codebook set are sequentially numbered from 0 to N−1, if the index of the last updated precoding matrix in the mth subframe is n, 0≤n≤N−1, from an index (n+1) mod N, the (m+Y)th subframe continues to use the precoding codebooks in the precoding codebook set in a circular manner. For example, if the precoding codebook set includes five precoding codebooks, which are sequentially numbered from 0 to 4, and each subframe traverses four precoding codebooks, then the codebook numbers of precoding codebooks sequentially used for the mth subframe on the frequency domain are {0,1,2,3}, and the codebook numbers of precoding codebooks used for the (m+Y)th subframe, the (m+2Y)th subframe, the (m+3Y)th subframe, and the (m+4Y)th subframe are respectively {4,0,1,2}, {3,4,0,1}, {2,3,4,0} and {1,2,3,4}, and so on.

With regard to the first predefined precoding mode, on a PRB, two precoding matrices are used to perform precoding processing on data, and Resource Elements (REs) of load data alternately use the two precoding matrices. Thus, for a physical resource block k on a subframe j, the codebook numbers of two precoding codebooks used are respectively $$\left(2 \cdot \left\lceil \frac{P}{X} \right\rceil \cdot \left\lfloor \frac{j}{Y} \right\rfloor + 2 \cdot \left\lfloor \frac{k}{X} \right\rfloor\right) \bmod N$$

and $$\left(2 \cdot \left\lceil \frac{P}{X} \right\rceil \cdot \left\lfloor \frac{j}{Y} \right\rfloor + 2 \cdot \left\lfloor \frac{k}{X} \right\rfloor + 1\right) \bmod N,$$

wherein j, k=0, 1, 2, 3, . . . , P is the number of PRBs occupied by data transmission of the control channel or the number of PRBs included in an MPDCCH-Physical Resource Block set (MPDCCH-PRB-set), and the MPDCCH-PRB-set includes all MPDCCH-PRB-sets monitored by the receiver.

For the second predefined precoding mode, on a PRB, one precoding matrix is used to perform precoding processing on data. Thus, the codebook number of a precoding codebook used for a physical resource block k on a subframe j is $$\left(\left\lceil \frac{P}{X} \right\rceil \cdot \left\lfloor \frac{j}{Y} \right\rfloor + \left\lfloor \frac{k}{X} \right\rfloor\right) \bmod N,$$

wherein j, k=0, 1, 2, 3, . . . , P is the number of PRBs occupied by the data transmission of a control channel or the number of PRBs included in an MPDCCH-PRB-set, and the MPDCCH-PRB-set includes all MPDCCH-PRB-sets monitored by the receiver.

In one or more exemplary implementations of the present embodiment, the precoding codebook set may include repeated precoding codebooks.

In one or more exemplary implementations of the present exemplary embodiment, the precoding codebook set may include odd number of precoding codebooks, and thus it can be ensured that all precoding codebooks are traversed by one PRB when performing time-domain updating.

In one or more exemplary implementations of the present exemplary embodiment, the predefined precoding mode may further include: based on the precoding codebook set, in frequency domain, one or more precoding codebooks are updated every X physical resource blocks, and the precoding matrices used within the X continuous PRBs do not change; and on a time domain, one or more precoding codebooks are updated every Y continuous subframes, and with regard to any one PRB, precoding matrices used for the PRB within the Y continuous subframes do not change, Furthermore, one precoding codebook used for the minimum PRB of the subframe m+Y is the same as one precoding codebook used for the maximum PRB of the subframe m. The minimum PRB refers to a PRB with the minimum index or a PRB with the lowest frequency, and the maximum PRB refers to a PRB with the maximum index or a PRB with the highest frequency, wherein m is greater than or equal to 0, and X and Y are greater than or equal to 1.

In one or more exemplary implementations of the present exemplary embodiment, assuming that precoding codebooks in a precoding codebook set are sequentially numbered from 0 to N−1, if the number of the last updated precoding matrix in the mth subframe is n, 0≤n≤N−1, from the number n, the (m+Y)th subframe continues to use the precoding codebooks in the precoding codebook set in a circular manner. For example, if the precoding codebook set includes five precoding codebooks, which are sequentially numbered from 0 to 4, and each subframe traverses four precoding codebooks, then the codebook numbers of precoding codebooks sequentially used for the mth subframe on the frequency domain are {0,1,2,3}, and the codebook numbers of precoding codebooks used for the (m+Y)th subframe, the (m+2Y)th subframe, the (m+3Y)th subframe, and the (m+4Y)th subframe are respectively {3,4,0,1}, {1,2,3,4}, {4,0,1,2} and {2,3,4,0}, and so on.

With regard to the first predefined precoding mode, on a PRB, two precoding matrices are used to perform precoding processing on data, and REs of load data alternately use the two precoding matrices. Thus, the codebook numbers of two precoding codebooks used for a physical resource block k on a subframe j are respectively $$\left(\left(2 \cdot \left\lceil \frac{P}{x} \right\rceil - 1\right) \cdot \left\lfloor \frac{j}{Y} \right\rfloor + 2 \cdot \left\lfloor \frac{k}{X} \right\rfloor\right) \bmod N$$

and $$\left(\left(2 \cdot \left\lceil \frac{P}{x} \right\rceil - 1\right) \cdot \left\lfloor \frac{j}{Y} \right\rfloor + 2 \cdot \left\lfloor \frac{k}{X} \right\rfloor + 1\right) \bmod N,$$

wherein j, k=0, 1, 2, 3, . . . , P is the number of PRBs occupied by data transmission of the control channel or the number of PRBs included in an MPDCCH-Physical Resource Block set (MPDCCH-PRB-set), and the MPDCCH-PRB-set includes all MPDCCH-PRB-sets monitored by the receiver.

For the second predefined precoding mode, on a PRB, one precoding matrix is used to perform precoding processing on data. Thus, the codebook number of a precoding codebook used for a physical resource block k on a subframe j is $$\left(\left(\left\lceil\frac{P}{x}\right\rceil-1\right)\cdot\left\lfloor\frac{j}{Y}\right\rfloor+\left\lfloor\frac{k}{X}\right\rfloor\right) \bmod N,$$

wherein j, k=0, 1, 2, 3, . . . , P is the number of PRBs occupied by the data transmission of a control channel or the number of PRBs included in an MPDCCH-PRB-set, and the MPDCCH-PRB-set includes all MPDCCH-PRB-sets monitored by the receiver.

In the present exemplary embodiment, the time-domain update of precoding codebooks is performed based on an Absolute Subframe Index.

In the present exemplary embodiment, one or more precoding codebooks are updated every Y continuous subframes, wherein Y is equal to a configuration parameter of a frequency hopping interval.

In one or more exemplary implementations of the present exemplary embodiment, the second predefined precoding mode may further include: within one subframe, for demodulation reference signal, a precoding codebook is updated every X PRBs; and for data, a precoding codebook is updated every L Resource Elements (REs). That is to say, a precoding codebook is updated for DMRSs on every X PRBs, and a precoding codebook is updated for data on every L REs, wherein X and L are integers greater than or equal to 1.

By means of the described technical solution, if the second predefined precoding mode only uses one precoding codebook in each PRB, the number of precoding codebooks which can be traversed on one subframe is small. Therefore, precoding matrices are updated once for data on every L REs, such that the update granularity is smaller than that of the PRB, and more precoding codebooks can be traversed, and a better diversity gain can be obtained. A DMRS takes a PRB as an update granularity, which can enable a receiver to perform channel estimation by using the DMRS. It should be noted that the range of application of this precoding method is not limited to the described search space and control channel, and the precoding method may also be used as an independent precoding method and used for other physical channels.

In one or more exemplary implementations of the present exemplary embodiment, the operation that the precoding codebook is updated every L REs includes: precoding codebook is updated for each RE, or precoding codebook is updated for each Resource Element Group (REG), or precoding codebook is updated for each Control Channel Element (CCE). The resource element group also includes an Enhanced Resource Element Group (EREG), and the control channel element also includes an Enhanced Control Channel Element (ECCE).

For example, assuming that the sender configures the aggregation level of a localized transmission MPDCCH as 4 ECCEs, the data transmission of the MPDCCH occupies one PRB. Thus, on one subframe, a DMRS can only traverse one precoding codebook. For data, if precoding codebooks are updated by taking an ECCE as update granularity, precoding codebooks can be updated for four times within one subframe. If precoding codebooks are updated by taking an EREG as update granularity, 1 ECCE=4 EREGs, then the precoding codebooks can be updated for 16 times within one subframe. If precoding codebooks are updated by taking an RE as update granularity, precoding codebooks are switched once per each RE.

In one or more exemplary implementations of the present exemplary embodiment, for DMRS of a control channel, precoding codebooks are updated according to a PRB Index and a Subframe Index; and for data of a control channel, precoding codebooks are updated according to an RE index or a resource element group index or a control channel element index, wherein the index may also be referred to as a serial number or a number. The receiver learns the update rule of precoding codebooks, and thus can determine the precoding matrices used for the MPDCCH.

In one or more exemplary implementations of the present exemplary embodiment, in a case where X is equal to the number of physical resource blocks included in an MPDCCH-PRB-set, fixed precoding codebooks are used for the DMRS of a control channel on the frequency domain, that is, precoding codebooks are not updated for the DMRS on the frequency domain, and the DMRSs of all PRBs use the same precoding codebooks.

In the present exemplary embodiment, the feedback precoding mode includes: control signalling is sent via a control channel, wherein the control signalling indicates precoding codebook information of a next control channel. The receiver receives the control signalling, and demodulates data of the next control channel by using the precoding codebook information indicated by the signalling.

In the present exemplary embodiment, one control channel includes one or more control channel subframes, and the number of control channel subframes included in one control channel is equal to the number of repetitions of the control channel.

In the present exemplary embodiment, the precoding codebook information of the control channel includes: the control channel uses a precoding codebook corresponding to the latest PMI reported by the receiver or uses precoding codebooks corresponding to the second predefined precoding mode. Therefore, the control signalling indicates that the next control channel uses the precoding codebook corresponding to the latest PMI reported by the receiver or uses precoding codebooks corresponding to the second predefined precoding mode.

The latest PMI reported by the receiver is the latest PMI available to the sender.

In one or more exemplary implementations of the present exemplary embodiment, the control signalling is an existing indication signalling in the control channel, and no additional signalling overhead is added.

In one or more exemplary implementations of the present exemplary embodiment, in a case where the control channel is used for scheduling a Physical Downlink Shared Channel (PDSCH) of a transmission mode (TM) 4 or a transmission mode 6, the control signalling is precoding matrix indicator confirmation (PMI confirmation for precoding), and the signalling also indicates precoding codebook information of the control channel while indicating precoding matrix indicator confirmation information of the PDSCH.

In a case where the control channel is used for scheduling a PDSCH of TM9, the control signalling is antenna port(s) and scrambling identity, and the control signalling also indicates precoding codebook information of the control channel while indicating the antenna port(s) and scrambling identity of the PDSCH.

Exemplary Embodiment 2

The exemplary embodiment 2 of the present disclosure is an exemplary embodiment of predefined precoding mode, which is applied to an MPDCCH. The method includes operations 1 and 2.

In operation 1, a precoding codebook set of an MPDCCH is determined.

In the present exemplary embodiment 2, the precoding codebook set includes N precoding codebooks which are sequentially numbered from 0 to N−1. In some exemplary implementations, the precoding codebook set may include repeated precoding codebooks, and in some exemplary implementations, N may be an odd number.

In the present exemplary embodiment 2, the sender may configure different numbers N of precoding codebooks for the precoding codebook set according to different numbers of transmitting antennas. N may be defined as a default value known to the sender and a receiver, and each number of transmitting antennas corresponds to one N value. In some exemplary implementations, for two transmitting antennas, there are a total of four single-layer precoding codebooks, and therefore the sender may configure, for the precoding codebook set, four available precoding codebooks or an odd number, greater than four, of precoding codebooks. For four transmitting antennas, there are a total of 16 single-layer precoding codebooks, and therefore the sender may configure, for the precoding codebook set, 16 available precoding codebooks or an odd number, greater than 16, of precoding codebooks.

In one or more exemplary implementations of the present exemplary embodiment, the arrangement sequence of the precoding codebooks in the precoding codebook set can ensure that the vector directions of precoding codebooks used for each MPDCCH subframe should traverse a large angle as much as possible. The arrangement sequence of the precoding codebooks in the precoding codebook set can be set as a default configuration known to the sender and the receiver, for example, with regard to different numbers of transmission antennas, corresponding default precoding codebook use sequences are set. In some exemplary implementations, the predefined precoding codebook use sequences may also be notified by higher-layer signalling.

In operation 2, based on the precoding codebook set, in frequency domain, one or more precoding codebooks are updated every X physical resource blocks; and on a time domain, one or more precoding codebooks are updated every Y continuous subframes.

In one or more exemplary implementations of the present exemplary embodiment, for two transmitting antennas, the precoding codebook set includes four precoding codebooks, which are sequentially numbered from 0 to 3, then the cycling use sequence of the precoding codebooks is {0, 1, 2, 3, 0, 1, 2, 3, 0, 1, 2, 3, 0, 1, 2, 3, . . . }. For 4 transmitting antennas, the precoding codebook set includes 16 precoding codebooks, which are sequentially numbered from 0 to 15, then the cycling use sequence of the precoding codebooks is {0, 1, 2, 3, . . . , 14, 15, 0, 1, 2, 3, . . . , 14, 15, 0, 1, 2, 3, . . . , 14, 15, . . . }.

It is assumed that an MPDCCH-PRB-set monitored by the receiver includes 6 PRBs, on the frequency domain, precoding codebooks are updated every 2 PRBs, and on the time domain, precoding codebooks are updated every Y continuous subframes.

In such a case, when the MPDCCH uses the first predefined precoding mode, for two transmitting antennas, codebook numbers of the two precoding codebooks used for one physical resource block k on a subframe j are respectively $$\left(2 \cdot 3 \cdot \left\lfloor \frac{j}{Y} \right\rfloor + 2 \cdot \left\lfloor \frac{k}{2} \right\rfloor\right) \bmod 4$$

and $$\left(2 \cdot 3 \cdot \left\lfloor \frac{j}{Y} \right\rfloor + 2 \cdot \left\lfloor \frac{k}{2} \right\rfloor + 1\right) \bmod 4.$$

For 4 transmitting antennas, the codebook numbers of two precoding codebooks used for the physical resource block k on the subframe j are respectively $$\left(2 \cdot 3 \cdot \left\lfloor \frac{j}{Y} \right\rfloor + 2 \cdot \left\lfloor \frac{k}{2} \right\rfloor\right) \bmod 16.$$

and $$\left(2 \cdot 3 \cdot \left\lfloor \frac{j}{Y} \right\rfloor + 2 \cdot \left\lfloor \frac{k}{2} \right\rfloor + 1\right) \bmod 16.$$

Figure 3:
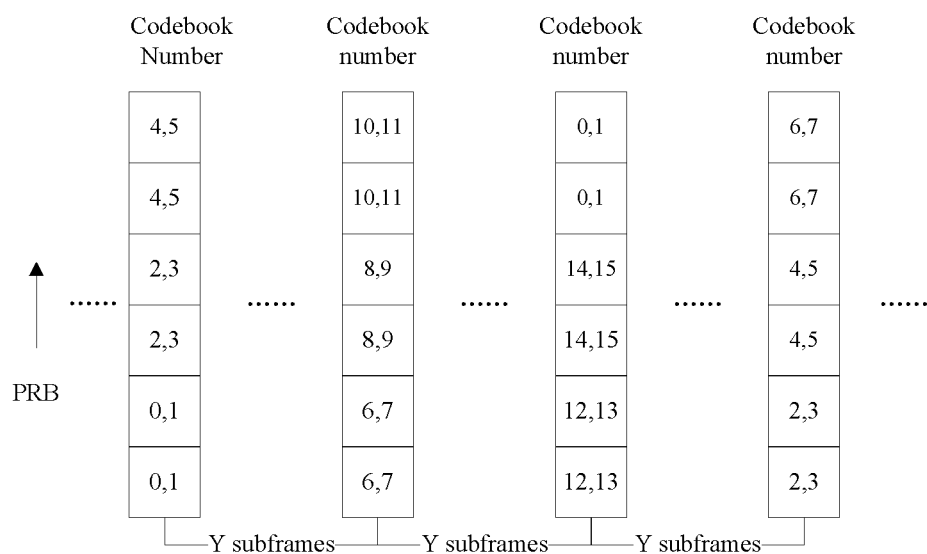
FIG. 3 is a schematic diagram (I) of codebook numbers according to some embodiments of the present disclosure.

In some exemplary implementations, the codebook numbers of precoding codebooks used for each PRB under a configuration of 4 transmitting antennas are as shown in FIG. 3.

When the MPDCCH uses the second predefined precoding mode, for two transmitting antennas, a codebook number of the one precoding codebook used for the physical resource block k on a subframe j is $$\left(3 \cdot \left\lfloor \frac{j}{Y} \right\rfloor + \left\lfloor \frac{k}{2} \right\rfloor\right) \bmod 4.$$

Figure 4:
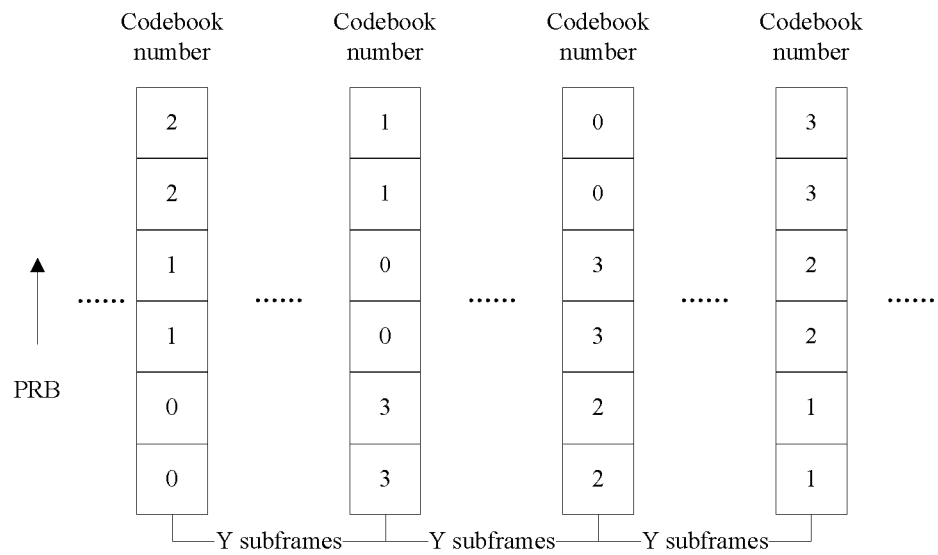
FIG. 4 is a schematic diagram (II) of codebook numbers according to some embodiments of the present disclosure.

In some exemplary implementations, the codebook numbers of precoding codebooks used for each PRB under a configuration of 2 transmitting antennas are as shown in FIG. 4. For 4 transmitting antennas, the codebook number of a precoding codebook used for the physical resource block k on the subframe j is $$\left(3 \cdot \left\lfloor \frac{j}{Y} \right\rfloor + \left\lfloor \frac{k}{2} \right\rfloor\right) \bmod 16.$$

In one or more exemplary implementations of the present exemplary embodiment 2, for two transmitting antennas, the precoding codebook set includes five precoding codebooks, which are sequentially numbered from 0 to 4, then the cycling use sequence of the precoding codebooks is {0, 1, 2, 3, 4, 0, 1, 2, 3, 4, 0, 1, 2, 3, 4, 0, 1, 2, 3, 4, . . . }. For 4 transmitting antennas, the precoding codebook set includes 17 precoding codebooks, which are sequentially numbered from 0 to 16, then the cycling use sequence of the precoding codebooks is {0, 1, 2, 3, . . . , 14, 15, 16, 0, 1, 2, 3, . . . , 14, 15, 16, 0, 1, 2, 3, . . . , 14, 15, 16, . . . }.

It is assumed that an MPDCCH-PRB-set monitored by the receiver includes 4 PRBs, on the frequency domain, precoding codebooks are updated for each PRB, and on the time domain, precoding codebooks are updated every Y continuous subframes.

Figure 5:
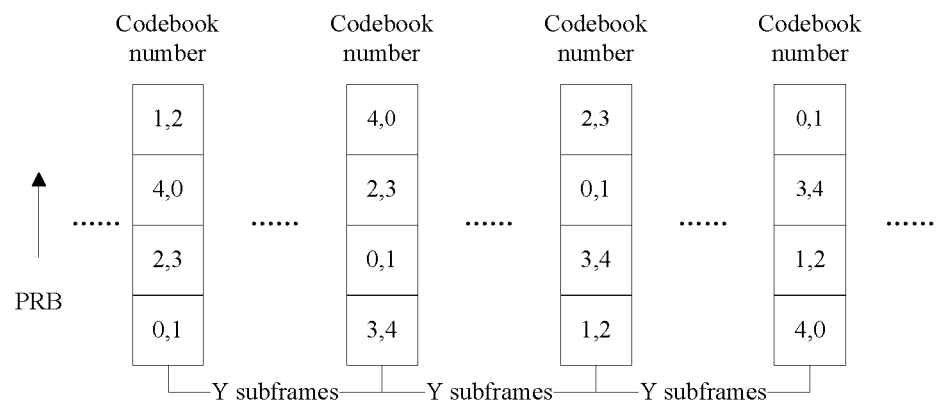
FIG. 5 is a schematic diagram (III) of codebook numbers according to some embodiments of the present disclosure.

In such a case, when the MPDCCH uses the first predefined precoding mode, for two transmitting antennas, the codebook numbers of two precoding codebooks used for the physical resource block k on the subframe j are respectively $$\left(2\cdot 4\cdot \left\lfloor \frac{j}{Y} \right\rfloor + 2\cdot k\right) \bmod 5$$

and 2·4·jy+2·k+1 mod 5. In some exemplary implementations, the codebook numbers of precoding codebooks used for each PRB under a configuration of 2 transmitting antennas are as shown in FIG. 5. For 4 transmitting antennas, the codebook numbers of two precoding codebooks used for the physical resource block k on the subframe j are respectively $$\left(2\cdot 4\cdot \left\lfloor \frac{j}{Y} \right\rfloor + 2\cdot k\right) \bmod 17$$

and $$\left(2\cdot 4\cdot \left\lfloor \frac{j}{Y} \right\rfloor + 2\cdot k + 1\right) \bmod 17.$$

When the MPDCCH uses the second predefined precoding mode, for two transmitting antennas, the codebook number of a precoding codebook used for the physical resource block k on the subframe j is $$\left(4\cdot \left\lfloor \frac{j}{Y} \right\rfloor + k\right) \bmod 5.$$

For 4 transmuting antennas, the number of the precoding codebook used for the physical resource block k on the subframe j is $$\left(4\cdot \left\lfloor \frac{j}{Y} \right\rfloor + k\right) \bmod 17.$$

Figure 6:
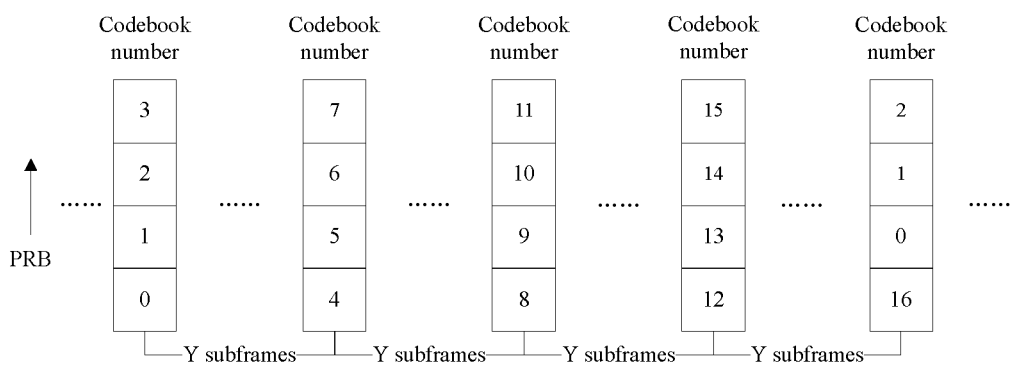
FIG. 6 is a schematic diagram (IV) of codebook numbers according to some embodiments of the present disclosure.

In some exemplary implementations, the codebook numbers of precoding codebooks used for each PRB under a configuration of 4 transmitting antennas are as shown in FIG. 6.

In the present exemplary embodiment 2, the update granularity on time domain and frequency domain of precoding codebooks can be set as a default configuration, for example, with regard to different MPDCCH-PRB-set configurations, corresponding default frequency domain update granularities are set. In some exemplary implementations, the update granularity on time domain and frequency domain of precoding codebooks may also be notified by higher-layer signalling.

Exemplary Embodiment 3

The exemplary embodiment 3 of the present disclosure provides a method for indicating a precoding matrix, which is applied to a physical control channel of a UE-specific search space. The method includes the following operations.

Control signalling is sent via a control channel, wherein the control signalling indicates a next control channel to use a precoding codebook corresponding to the latest PMI reported by a receiver or to use precoding codebooks corresponding to the second predefined precoding mode. Upon receiving the control signalling, the receiver can determine a precoding matrix used for an MPDCCH.

In one or more exemplary implementations of the present exemplary embodiment, signalling sent by the Kth control channel indicates information of a precoding matrix used for the (K+1)th control channel, wherein K is greater than or equal to 1. After receiving the control signalling sent by the Kth control channel, the receiver demodulates data of time-frequency resource of the (K+1)th control channel by using precoding matrix information indicated by the signalling. Thus, regarding a control channel, the receiver can achieve joint channel estimation of CRS and DMRS.

In the present exemplary embodiment 3, one control channel includes one or more control channel subframes, and the number of control channel subframes included in one control channel is equal to the number of repetitions of the control channel.

In the present exemplary embodiment 3, the control signalling is an existing indication signalling in the control channel, and no additional signalling overhead is added.

In the present exemplary embodiment 3, in a case where the control channel is used for scheduling a PDSCH of TM4 or TM6, precoding codebook information of the control channel is indicated by using the existing control signalling "precoding matrix indicator confirmation (PMI confirmation for precoding)". The control signalling not only indicates information of precoding matrix indicator confirmation of the PDSCH, but also indicates precoding codebook information of the control channel.

In one or more exemplary implementations of the present exemplary embodiment, the precoding matrix indicator confirmation signalling is 1-bit information, and when the value of the control signalling is 1, the PDSCH uses a precoding codebook corresponding to the latest PMI reported by the receiver, and the control channel also uses a precoding codebook corresponding to the latest PMI reported by the receiver; and when the value of the control signalling is 0, the control channel uses precoding codebooks corresponding to the second predefined precoding mode.

In the present exemplary embodiment 3, in a case where the control channel is used for scheduling a PDSCH of TM9, the existing control signalling "antenna port(s) and scrambling identity" is used for indicating precoding codebook information of the control channel. The control signalling not only indicates antenna port(s) and scrambling identity of the PDSCH, but also indicates precoding codebook information of the control channel.

In one or more exemplary implementations of the present exemplary embodiment, the signalling of the antenna port(s) and scrambling identity is 2-bit information. The precoding codebook information of the control channel can be indicated by using the signalling in one of the following two ways.

In method I, switching of two antenna ports is used for indicating whether the control channel uses the precoding codebook corresponding to the latest PMI reported by the receiver or uses the precoding codebooks corresponding to the second predefined precoding mode. In some exemplary implementations, an antenna port 7 indicates that the control channel uses a precoding codebook corresponding to the latest PMI reported by the receiver, or an antenna port 8 indicates that the control channel uses a precoding codebook corresponding to the latest PMI reported by the receiver, and another antenna port indicates that the control channel uses precoding codebooks corresponding to the second predefined precoding mode.

In method II, two values of scrambling identity nSCID are used to indicate whether a control channel uses a precoding codebook corresponding to the latest PMI reported by a receiver or uses precoding codebooks corresponding to the second predefined precoding mode. In some exemplary implementations, nSCID=1 indicates that the control channel uses a precoding codebook corresponding to the latest PMI reported by the receiver, and nSCID=0 indicates that the control channel uses precoding codebooks corresponding to the second predefined precoding mode.

The above latest PMI reported by the receiver is the latest PMI available to the sender.

Exemplary Embodiment 4

The exemplary embodiment 4 of the present disclosure can be understood as one exemplary embodiment of the exemplary embodiment 3, which is applied to a localized MPDCCH. The method includes operations 201 and 202.

In operation 201, control signalling is sent via an MPDCCH, wherein the control signalling indicates a next MPDCCH to use a precoding codebook corresponding to the latest PMI reported by a receiver or to use precoding codebooks corresponding to the second predefined precoding mode.

In the present exemplary embodiment 4, the control signalling sent in the Kth MPDCCH indicates whether the (K+1)th MPDCCH uses the precoding codebook corresponding to the latest PMI reported by the receiver or uses the precoding codebooks corresponding to the second predefined precoding mode.

Figure 7:
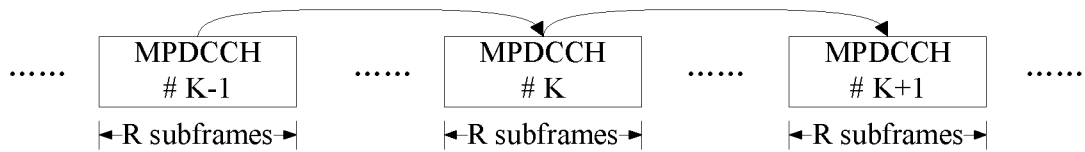
FIG. 7 is a schematic diagram of the indication of precoding information according to some embodiments of the present disclosure.

In the present exemplary embodiment 4, one MPDCCH includes R subframes on the time domain, R is equal to the number of repetitions of the MPDCCH, and includes all MPDCCH-PRB-sets monitored by the receiver on the frequency domain. FIG. 7 is an indication relationship of the control signalling under non-repetition of an MPDCCH. When the MPDCCH is transmitted in a non-repeated manner, R=1.

In operation 202, after receiving the control signalling sent by the Kth MPDCCH, the receiver determines a precoding codebook used for the (K+1)th MPDCCH, and demodulates data of the (K+1)th MPDCCH.

In the present exemplary embodiment 4, when the MPDCCH is used to schedule a PDSCH of TM6, the control signalling is precoding matrix indicator confirmation signalling. The receiver receives the control signalling sent by the Kth MPDCCH. If the control signalling is equal to 0, the (K+1)th MPDCCH uses precoding codebooks corresponding to the second predefined precoding mode. Herein, the second predefined precoding mode is a default configuration of the sender and the receiver. The receiver learns the use rule of the second predefined precoding mode, and therefore the precoding matrix used for the (K+1)th MPDCCH can be determined, and joint channel estimation using CRS and DMRS can be performed. If the control signalling is equal to 1, the (K+1)th MPDCCH uses a precoding codebook corresponding to the latest PMI reported by the receiver, and this information is stored when the receiver reports the PMI, and therefore a precoding matrix used for the (K+1)th MPDCCH can be determined, and then the (K+1)th MPDCCH data is demodulated.

In the present exemplary embodiment 4, when the MPDCCH is used for scheduling a PDSCH of TM9, the control signalling is signalling of antenna port(s) and scrambling identity. The control signalling is 2-bit information, and two values of scrambling identity nSCID are used to indicate whether the control channel uses a precoding codebook corresponding to the latest PMI reported by the receiver or uses precoding codebooks corresponding to the second predefined precoding mode.

A specific operation mode is: the receiver receives the control signalling sent by the Kth MPDCCH, and if the control signalling is equal to 0 or 2, i.e. nSCID=0, the (K+1)th MPDCCH uses the precoding codebooks corresponding to the second predefined precoding mode; and if the control signalling is equal to 1 or 3, i.e. nSCID=1, the (K+1)th MPDCCH uses the precoding codebook corresponding to the latest PMI reported by the receiver. Thus, the receiver can determine the precoding matrix used for the (K+1)th MPDCCH, and use CRS and DMRS to perform joint channel estimation.

In the present exemplary embodiment 4, when the joint channel estimation of CRS and DMRS is enabled, it is defaulted to the receiver that the first MPDCCH uses the first predefined precoding mode or the second predefined precoding mode, so as to demodulate the data of the first MPDCCH.

Some embodiments of the present disclosure provide a storage medium. The storage medium has programs stored therein, wherein the programs are configured to execute, when running, the described any one method.

In one or more exemplary implementations of the present embodiment, the described storage medium may be configured to store a computer program for executing the following operations:

S1, a sender determines a precoding mode according to a type of a control channel, wherein the precoding mode at least includes one of: a predefined precoding mode or a feedback precoding mode; and S2, the sender performs precoding processing on data of the control channel according to the precoding mode.

In one or more exemplary implementations of the present embodiment, the storage medium may include but is not limited to: any media that can store computer programs, such as a USB flash drive, a Read-Only Memory (ROM for short), a Random Access Memory (RAM for short), a removable hard disk, a magnetic disk, or an optical disc.

In one or more exemplary implementations of the present embodiment, for specific examples in the present embodiment, reference can be made to the examples described in the described examples and exemplary embodiments, and thus they will not be repeated again in the present embodiment.

It is apparent that a person skilled in the art shall understand that all of the above-mentioned modules or operations in the present disclosure may be implemented by using a general computation apparatus, may be centralized on a single computation apparatus or may be distributed on a network composed of multiple computation apparatuses. In some exemplary implementations, they may be implemented by using executable program codes of the computation apparatuses. Thus, they may be stored in a storage apparatus and executed by the computation apparatuses, the shown or described operations may be executed in a sequence different from this sequence under certain conditions, or they are manufactured into each integrated circuit module respectively, or multiple modules or operations therein are manufactured into a single integrated circuit module. Thus, the embodiments of the present disclosure are not limited to any specific hardware and software combination.

The above is only the exemplary embodiments of the present disclosure, not intended to limit the present disclosure. As will occur to those having ordinary skill in the art, the present disclosure is susceptible to various modifications and changes. Any modifications, equivalent replacements, improvements and the like made within the principle of the present disclosure shall fall within the scope of protection of the present disclosure.

INDUSTRIAL APPLICABILITY

By means of the described technical solutions of the present disclosure, a precoding mode can be determined according to a type of a control channel, then precoding processing is performed on data of the control channel according to the precoding mode. The described technical solution can be used to solve the problem in the related art concerning which encoding mode a sender uses to precode data of a control channel, and can perform precoding processing on data of the control channel in a precoding mode determined according to the type of the control channel.

What is claimed is:

1. A precoding processing method for data, performed by a precoding processing apparatus for data at a sender and comprising:
   determining a precoding mode according to a type of a control channel, wherein the precoding mode at least comprises one of: a predefined precoding mode or a feedback precoding mode; and
   performing precoding processing on data of the control channel according to the precoding mode;
   wherein determining the precoding mode according to the type of the control channel comprises:
determining the precoding mode at least according to a type of a search space of the control channel.

2. The method according to claim 1, wherein the type of the search space at least comprises one of: type-1 common search space, type-2 common search space or User Equipment (UE)-specific search space; and the precoding mode at least comprises one of: a first predefined precoding mode, a second predefined precoding mode or the feedback precoding mode,
   wherein
   the control channel of the type-1 common search space uses the first predefined precoding mode;
   the control channel of the type-2 common search space uses the first predefined precoding mode; and
   the control channel of the UE-specific search space uses at least one of: the first predefined precoding mode, the second predefined precoding mode and the feedback precoding mode.

3. The method according to claim 2, wherein the type of the search space further comprises: a type-3 common search space,
   wherein the control channel of the type-3 common search space uses at least one of: the first predefined precoding mode, the second predefined precoding mode and the feedback precoding mode.

4. The method according to claim 1, wherein the predefined precoding mode comprises: determining a precoding codebook set; and sequentially using, based on the precoding codebook set, precoding codebooks in the precoding codebook set for the control channel in a circular manner.

5. The method according to claim 4, wherein sequentially using, based on the precoding codebook set, precoding codebooks in the precoding codebook set for the control channel in the circular manner comprises:
   within one subframe, updating one or more precoding codebooks every X physical resource blocks; and
   between different subframes, updating one or more precoding codebooks every Y continuous subframes, wherein one precoding codebook used for a minimum physical resource block on a subframe m+Y is in a successive relationship with one precoding codebook used for a maximum physical resource block on a subframe m, m is greater than or equal to 0, and X and Y are positive integers.

6. The method according to claim 2, wherein the first predefined precoding mode comprises: using two precoding codebooks for one physical resource block, wherein in a case where precoding codebooks in a precoding codebook set are sequentially numbered from 0 to N−1, codebook numbers of the two precoding codebooks used for one physical resource block k on a subframe j are respectively $$\left(2\cdot\left\lceil\frac{P}{X}\right\rceil\cdot\left\lfloor\frac{j}{Y}\right\rfloor+2\cdot\left\lfloor\frac{k}{X}\right\rfloor\right)\bmod N$$

and $$\left(2\cdot\left\lceil\frac{P}{X}\right\rceil\cdot\left\lfloor\frac{j}{Y}\right\rfloor+2\cdot\left\lfloor\frac{k}{X}\right\rfloor+1\right)\bmod N,$$

where j and k are greater than or equal to 0, and P is the number of physical resource blocks occupied by data transmission of the control channel or the number of physical resource blocks comprised in one or more physical resource block sets of a Machine Type Communication-Physical Downlink Control Channel (MPDCCH).

7. The method according to claim 2, wherein the second predefined precoding mode comprises: using one precoding codebook for one physical resource block, wherein in a case where precoding codebooks in a precoding codebook set are sequentially numbered from 0 to N−1, a codebook number of the one precoding codebook used for the physical resource block k on a subframe j is $$\left(\left\lceil\frac{P}{X}\right\rceil\cdot\left\lfloor\frac{j}{Y}\right\rfloor+\left\lfloor\frac{k}{X}\right\rfloor\right)\bmod N,$$

where j and k are greater than or equal to 0, and P is the number of physical resource blocks occupied by data transmission of the control channel or the number of physical resource blocks comprised in one or more physical resource block sets of a Machine Type Communication-Physical Downlink Control Channel (MPDCCH).

8. The method according to claim 4, wherein sequentially using, based on the precoding codebook set, precoding codebooks in the precoding codebook set for the control channel in the circular manner comprises:
   within one subframe, updating one or more precoding codebooks every X physical resource blocks; and
   between different subframes, updating one or more precoding codebooks every Y continuous subframes, wherein one precoding codebook used for a minimum physical resource block on a subframe m+Y is the same as one precoding codebook used for a maximum physical resource block on a subframe m, m is greater than or equal to 0, and X and Y are positive integers.

9. The method according to claim 2, wherein the first predefined precoding mode comprises: using two precoding codebooks for one physical resource block, wherein in a case where precoding codebooks in a precoding codebook set are sequentially numbered from 0 to N−1, codebook numbers of the two precoding codebooks used for one physical resource block k on a subframe j are respectively $$\left(\left(2\cdot\left\lceil\frac{P}{X}\right\rceil-1\right)\cdot\left\lfloor\frac{j}{Y}\right\rfloor+2\cdot\left\lfloor\frac{k}{X}\right\rfloor\right)\bmod N$$

and $$\left(\left(2\cdot\left\lceil\frac{P}{X}\right\rceil-1\right)\cdot\left\lfloor\frac{j}{Y}\right\rfloor+2\cdot\left\lfloor\frac{k}{X}\right\rfloor+1\right)\bmod N,$$

where j and k are greater than or equal to 0, and P is the number of physical resource blocks occupied by data transmission of the control channel or the number of physical resource blocks comprised in one or more physical resource block sets of a Machine Type Communication-Physical Downlink Control Channel (MPDCCH).

10. The method according to claim 2, wherein the second predefined precoding mode comprises: using one precoding codebook for one physical resource block, wherein in a case where precoding codebooks in a precoding codebook set are sequentially numbered from 0 to N−1, a codebook number of the one precoding codebook used for the physical resource block k on a subframe j is $$\left(\left(\left\lceil\frac{P}{X}\right\rceil-1\right)\cdot\left\lfloor\frac{j}{Y}\right\rfloor+\left\lfloor\frac{k}{X}\right\rfloor\right)\bmod N,$$

where j and k are greater than or equal to 0, and P is the number of physical resource blocks occupied by data transmission of the control channel or the number of physical resource blocks comprised in one or more physical resource block sets of a Machine Type Communication-Physical Downlink Control Channel (MPDCCH).

11. The method according to claim 4, wherein the precoding codebook set comprises: repeated precoding codebooks;

or, the precoding codebook set comprises: odd number of precoding codebooks.

12. The method according to claim 2, wherein the second predefined precoding mode comprises: within one subframe, for demodulation reference signal, updating a precoding codebook every X physical resource blocks, and for data, updating a precoding codebook every L resource elements, wherein X and L are both positive integers.

13. The method according to claim 12, wherein updating the precoding codebook every L resource elements comprises: updating the precoding codebook for each resource element, or updating the precoding codebook for each resource element group, or updating the precoding codebook for each control channel element.

14. The method according to claim 12, wherein the second predefined precoding mode comprises: for demodulation reference signal, updating the precoding codebook according to a physical resource block index and a subframe index; and for data, updating the precoding codebook according to a resource element index or a resource element group index or a control channel element index.

15. The method according to claim 12, wherein in a case where X is equal to the number of physical resource blocks comprised in one or more physical resource block sets of the control channel, one or more fixed precoding codebooks are used for demodulation reference signal of the control channel in frequency domain.

16. The method according to claim 2, wherein the feedback precoding mode comprises: sending control signalling via the control channel, wherein the control signalling is used for indicating that precoding codebooks used for a next control channel at least comprise one of: a precoding codebook corresponding to the latest precoding matrix indicator reported by a receiver, or precoding codebooks corresponding to the second predefined precoding mode.

17. The method according to claim 16, wherein in a case where the control channel is used for scheduling a physical shared channel of a transmission mode 4 or a transmission mode 6, a signalling of precoding matrix indicator confirmation is used for indicating that the precoding codebooks used for the next control channel at least comprise one of: the precoding codebook corresponding to the latest precoding matrix indicator reported by the receiver, or the precoding codebooks corresponding to the second predefined precoding mode;

or, in a case where the control channel is used for scheduling a physical shared channel of a transmission mode 9, a signalling of antenna port and scrambling identity is used for indicating that the precoding codebooks used for the next control channel at least comprise one of: the precoding codebook corresponding to the latest precoding matrix indicator reported by the receiver, or the precoding codebooks corresponding to the second predefined precoding mode.

18. A precoding processing apparatus for data, comprising a memory storing instructions and a processor in communication with the memory, wherein the processor is configured to execute the instructions to:

determine a precoding mode according to a type of a control channel, wherein the precoding mode at least comprises one of: a predefined precoding mode or a feedback precoding mode; and perform precoding processing on data of the control channel according to the precoding mode;

wherein the processor is further configured to execute the instructions to determine the precoding mode at least according to a type of a search space of the control channel.

19. A non-transitory storage medium in which computer programs are stored, wherein the computer programs are configured to execute, when running, the following operations:

determining a precoding mode according to a type of a control channel, wherein the precoding mode at least comprises one of: a predefined precoding mode or a feedback precoding mode; and performing precoding processing on data of the control channel according to the precoding mode;

wherein the computer programs are further configured to execute, when running, the following operation: determining the precoding mode at least according to a type of a search space of the control channel.

\* \* \* \* \*